United States Patent [19]

Sato et al.

[11] Patent Number: 5,107,415
[45] Date of Patent: Apr. 21, 1992

[54] MICROPROCESSOR WHICH AUTOMATICALLY REARRANGES THE DATA ORDER OF THE TRANSFERRED DATA BASED ON PREDETERMINED ORDER

[75] Inventors: Koichi Sato; Yoshiaki Kittaka, both of Itami, Japan

[73] Assignee: Mitsubishi Denki Kabushiki Kaisha, Tokyo, Japan

[21] Appl. No.: 331,481

[22] Filed: Mar. 31, 1989

[30] Foreign Application Priority Data

Oct. 24, 1988 [JP] Japan ................................. 63-267396

[51] Int. Cl.$^5$ ................................................ G06F 7/00
[52] U.S. Cl. ..................................... 395/800; 364/228; 364/260; 364/260.9; 364/926.1; 364/923.6; 364/939; 364/939.2; 364/947.7; 364/951.41; 364/DIG. 1; 364/DIG. 2; 364/951.4
[58] Field of Search ... 364/200 MS File, 900 MS File

[56] References Cited

U.S. PATENT DOCUMENTS 3,573,744  6/1971  Rigazio ............................. 364/200
4,654,781  3/1987  Schwartz et al. .................. 364/200
4,814,976  3/1989  Hansen et al. ..................... 364/200
4,931,925  6/1990  Utsumi et al. ..................... 364/200
4,959,779  9/1990  Weber et al. ...................... 364/200

OTHER PUBLICATIONS

"Open Architecture Computer Systems," Tron Project 1987, K. Sakamura, ed.; pp. 212-213.

Primary Examiner—Thomas C. Lee
Assistant Examiner—Krisna Lim
Attorney, Agent, or Firm—Townsend and Townsend

[57] ABSTRACT

A microprocessor which exchanges data of a plurality of bits arranged in a predetermined order by every predetermined number of bits comprises, an area assignment register for assigning a certain area in an address space, a holding register for holding order information of data in the assigned area, and a circuit for rearranging the data bits order in response to the order information when data are exchanged with the assigned area, and processes the data to increase the execution speed by rearranging the data order automatically by hardwares in response to the order information of data in the area, when respective microprocessors in a multiprocessor system share a certain area of a main memory.

8 Claims, 8 Drawing Sheets

Fig. 1
Prior Art

LEGEND:
   MSB = MOST SIGNIFICANT BYTE
   LSB = LEAST SIGNIFICANT BYTE

MICROPROCESSOR WHICH AUTOMATICALLY REARRANGES THE DATA ORDER OF THE TRANSFERRED DATA BASED ON PREDETERMINED ORDER

BACKGROUND OF THE INVENTION

1. Field of the Invention

The present invention relates to a multiprocessor system and a microprocessor constituting the same, particularly, it relates to improvement of byte polarity processing of data.

2. Description of the Prior Art

Figure 1:
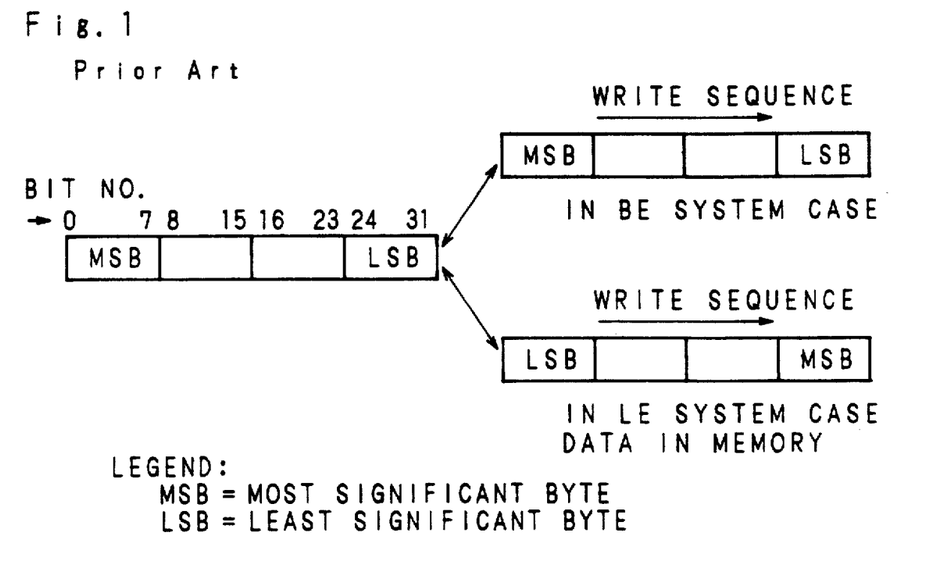
FIG. 1 is an explanatory view of an exchanging system between a microprocessor and a memory.

When data are exchanged between a microprocessor and a memory, the data are generally inputted and/or outputted in every division of a certain number of bits. In the following, the case wherein the 32-bit microprocessor deals with 32-bit data will be described as an example. The 32-bit microprocessor divides the 32-bit data into four parts by one byte (8 bits) a part. FIG. 1 is an explanatory view showing the data exchange between the microprocessor and the memory. At this time, one byte in the higher position is called MSB (Most Significant Byte) and that in the lower position is called LSB (Least Significant Byte). As shown in FIG. 1, when data are exchanged with the memory, there are two systems, one is called a big endian system (hereinafter referred to as BE system) and the other is called a little endian system (hereinafter referred to as LE system). For example, when the data are inputted and/or outputted, in the BE system, they are written successively from the assigned address in the memory to four sequential addresses in the order from the byte on the MSB side to the higher address. Conversely, in the LE system, they are written successively in the order from the byte on the LSB side to the higher address. The system by which the data are inputted and/or outputted is set for each microprocessor, which is referred to as a byte polarity of the microprocessor.

Figure 2:
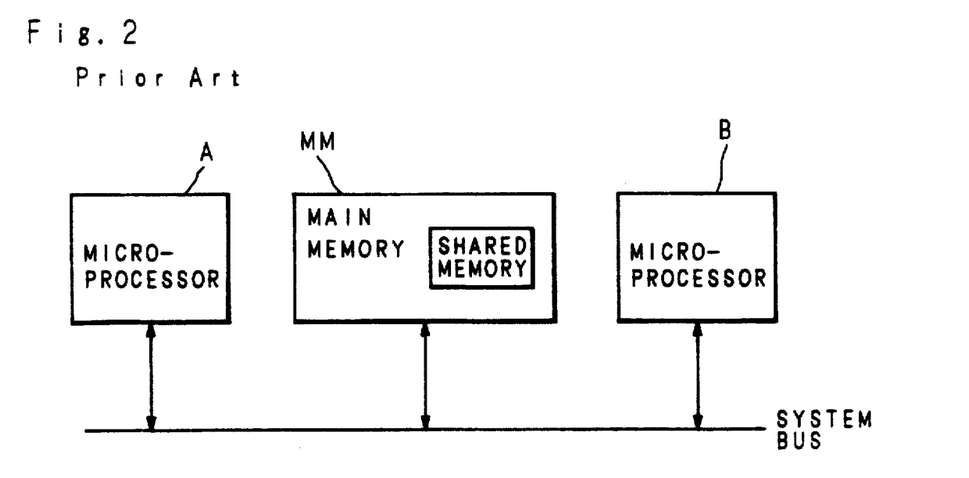
FIG. 2 is a block diagram showing the relationship between microprocessors and a main memory of a conventional multiprocessor system.

Now, in a multiprocessor system wherein a plurality of microprocessors are connected by a same system bus, respective microprocessors share a certain area (shared memory area) of a main memory connected to the system bus to communicate therebetween. FIG. 2 is a block diagram showing the relationship between the microprocessor and a main memory of a conventional multiprocessor system, wherein when data are sent from the microprocessor (A) to the microprocessor (B) connected via a system bus, the former writes the data in a shared memory area of the main memory (MM) and the latter reads the written data therefrom.

At this time, when data are exchanged between the microprocessors having different byte polarities, the compatibility of the data must be maintained. For examples, when the microprocessor of the BE system reads the data of plural byte lengths in the shared memory area written by the microprocessor of the LE system, the former must reverse the byte order of the data being read. The rearrangement is generally executed by softwares. The microprocessor capable of executing data rearrangement by one command by preparing the data rearrangement command has also been developed.

In the multiprocessor system using two microprocessors whose byte polarities are different each other, it must be determined and processed whether the rearrangement of byte order of the data is necessary when accessing the memory. If this is processed by the softwares, the number of commands is increased, which accordingly makes an overhead of the microprocessor larger and delays the whole execution speed. In addition, a problem occurs that the programmer who develops an operation system of the multiprocessor system has to prepare for the data byte order rearrangement routine.

SUMMARY OF THE INVENTION

The present invention has been devised to solve the aforesaid problems, and it is an object thereof to provide a microprocessor in which reverse and non-reverse of the byte polarity are processed automatically by hardwares for fast execution speed in a multiprocessor system.

It is another object of the present invention to provide a microprocessor in which reverse and non-reverse of the byte polarity are processed not by softwares but by hardwares automatically to facilitate development of a multiprocessor system.

The above and further objects and features of the invention will more fully be apparent from the following detailed description with accommpanying drawings.

DESCRIPTION OF THE PREFERRED EMBODIMENTS

Figure 3:
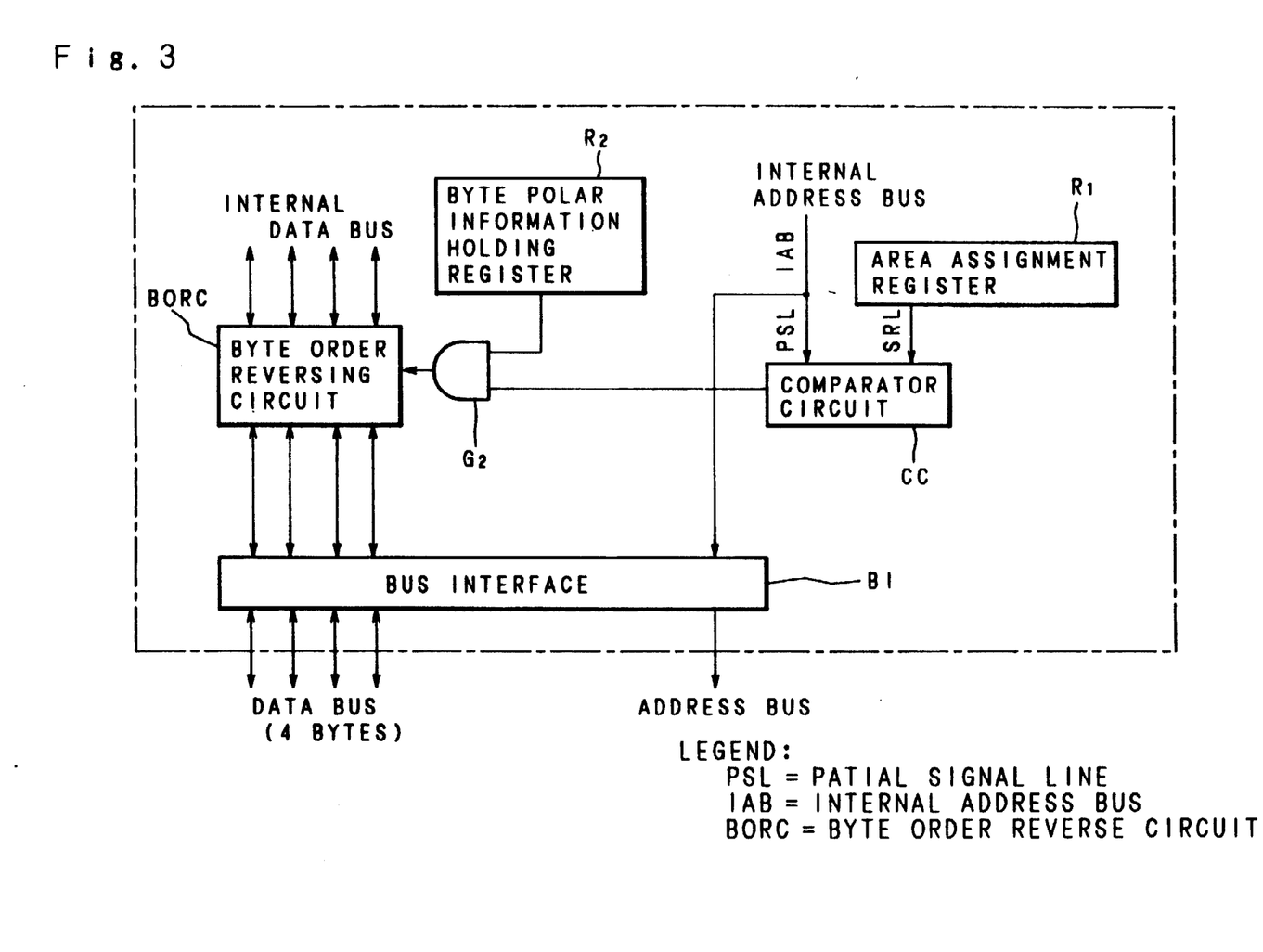
FIG. 3 is a block diagram showing the configuration of essential portions of a microprocessor of the present invention.

An embodiment of the present invention will be described in the following employing a 32-bit microprocessor as an example. FIG. 3 shows a block diagram of essential portions with respect to the microprocessor of the present invention. An area assignment register (R1) for assigning a shared memory area comprises a plurality of bits.

Figure 4:
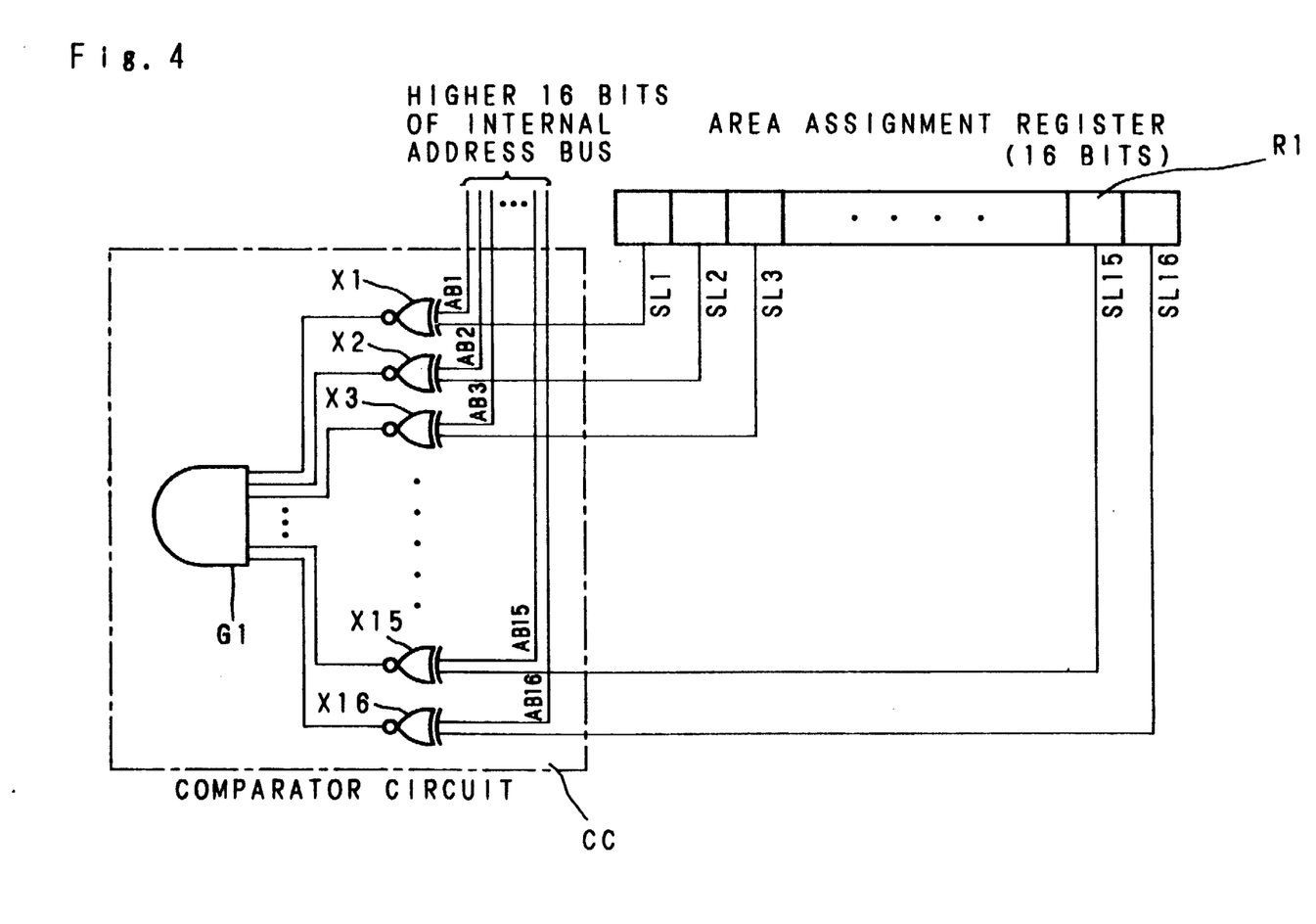
FIG. 4 is a circuit diagram of an area assignment register and a comparator circuit when a shared memory area is 64K.
Figure 5:
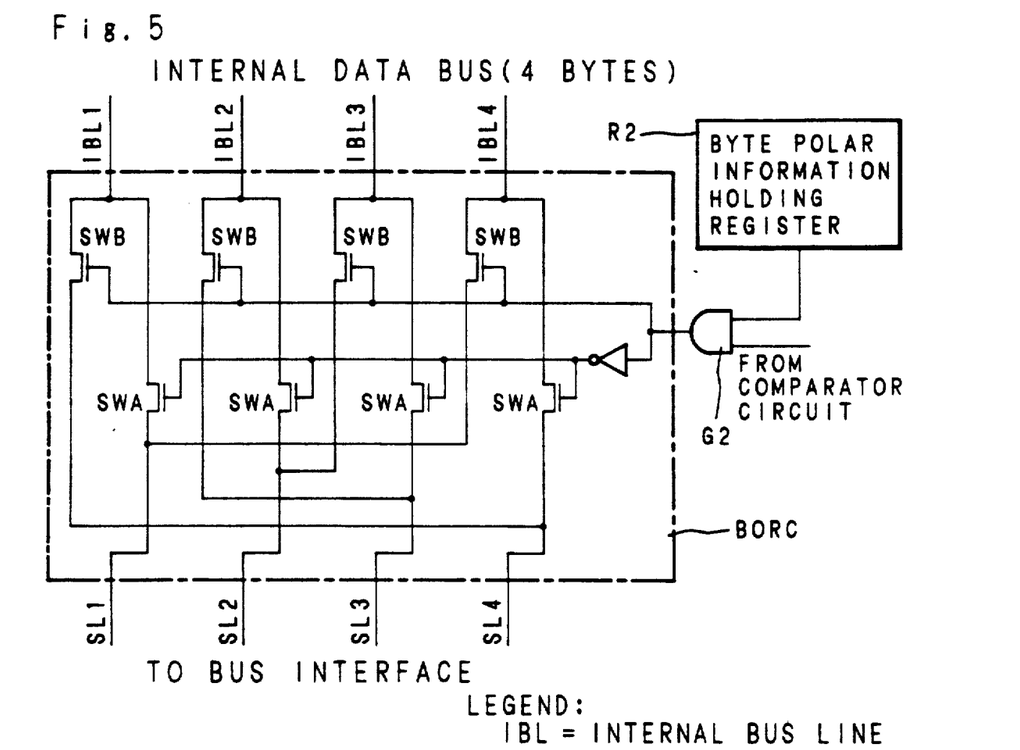
FIG. 5 is a circuit diagram showing the configuration of a byte reversing circuit.

A signal line (SL) from the register (R1) and a partial signal line (PSL) of an internal address bus (IAB) are connected to a comparator circuit (CC). FIG. 4 shows a circuit diagram of the register (R1) and comparator circuit (CC) when the shared memory area is 64K ($=2^{16}$, assigned by the 16-bit address). In this case, the register (R1) comprises 16 bits. Signal line (SL1)~(SL16) (represented as (SL) together in FIG. 3) from respective bits are connected to XOR gates (X1)~(X16) together with respective signal lines (AB1)~(AB16) (represented as (PSL) together in FIG. 3) of the higher 16 bits of the internal address bus (TAB) of the microprocessor. Outputs from the 16 XOR gates (X1)~(X16) are connected to an AND gate (G1). In FIG. 3, a register (R2) holding byte polar information comprises one bit and is connected to an AND gate (G2), which is connected to a byte order reversing circuit (BORC) so as to output thereto. The byte order reversing circuit (BORC) is incorporated between the bus interface portion (BIP) and the internal data bus of the microprocessor. FIG. 5 shows an internal circuit diagram of the byte reversing circuit. By the output of the AND gate (G2), either switch (SWA) or (SWB) is turned on, and the signal lines (SL1)~(SL4) (one byte each) from the bus interface portion (BIP) and the internal data buses (IDB1)~(IDB4) (one byte each) are interconnected directly or reversely.

Figure 6:
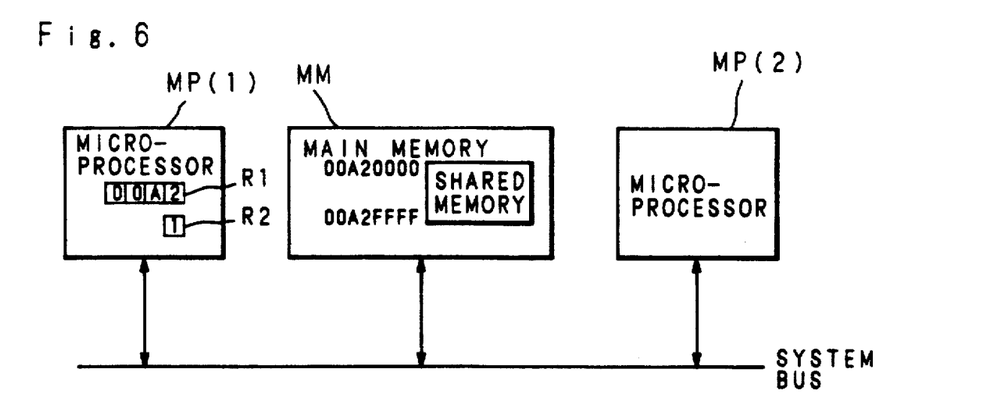
FIG. 6 is a block diagram of a multiprocessor system using a microprocessor of the present invention and a conventional microprocessor.
Figure 7:
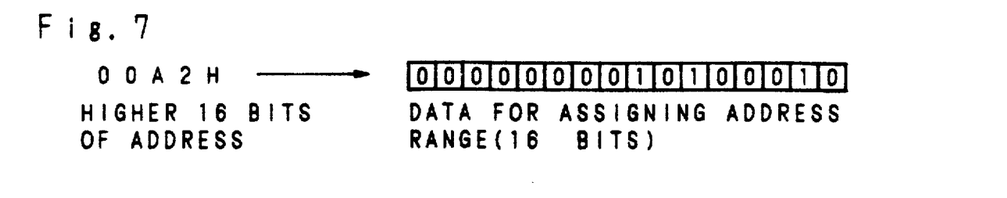
FIG. 7 is a an explanatory view of writing data in an area assigned register.

As shown in FIG. 6, the operation of a multiprocessor system using a microprocessor according to the present invention and a prior art microprocesssor will be described. In FIG. 6, the present microprocessor is indicated as MP (1) and the prior art microprocessor as MP (2). Now, assume that their byte polarities are different each other and data of the MP (2) are transferred to the MP (1) via a shared memory area (C), whose addresses are "00A20000H"~"00A2FFFFH". First, higher 16 bits "000A2H" of the address are written in the register (R1) of the MP (1) in the data form shown in FIG. 7, and "1" representing the different byte polarity is written in the register (R2) by softwares in advance. Assume that from the MP (2), the data to be transferred are written in a memory in the shared memory area (C). Now, when the MP (1) reads the written data, the address in the shared memory area (C) is accessed first, so that data written in the register (R1) in FIG. 4 correspond to the higher 16 bits of the internal address bus. Thereby, a "H" level is outputted from the entire XOR gates (X1)~(X16) and the output of the AND gate (G1) becomes the "H" level. Furthermore, in FIG. 3, since "1" is written in the 185 with the output from the AND gate (G1) in the comparator circuit (CC), becomes a "H" level to turn on switches (SWB) in a byte order reversing circuit (BORC). When the switches (SWB) are turned on, data inputted from the bus interface portion (BIP) are reversed in a byte unit so as to be taken into the internal data bus of the MP (1). In such a way, the data are reversed by the hardwares when the address in the shared memory area is accessed by the MP (1). Then, since the contents of the register (R1) and the higher 16 bits of the internal data bus are different when the address in the exclusive memory area of the MP (1), not in the shared memory area, is accessed, the output of the AND gate (G1) becomes a "L" level and, as a result, the output of the AND gate (G2) also becomes the "L" level to turn on switches (SWA). And the data from the bus interface portion (BIP) are taken into the internal data bus of the MP (1) without being reversed.

In such a manner, if the shared memory area (C) of the main memory (MM) is assigned in advance, it is possible to determine automatically by the hardwares whether to reverse or not to reverse the data, depending upon whether the address to be accessed is in the shared memory area or not.

When the data polarities of the MP (1) and MP (2) are same, "0" is written in the register (R2) in advance by softwares. Then the output of the AND gate (G2) always show the "L" level and the switches (SWA) are turned on, so that the data is taken into the internal data bus of the MP (1) without being reversed.

Conversely, also in the case of transferring data from the MP (1) to the MP (2), exactly similarly, the MP (1) is able to determine automatically the necessity of reversing the data and to execute the reverse.

If the byte order reversing circuit (BORC) is incorporated in the bus interface portion (BIP) in designing the circuit, the number of circuit component elements may be reduced as a whole.

Figure 8:
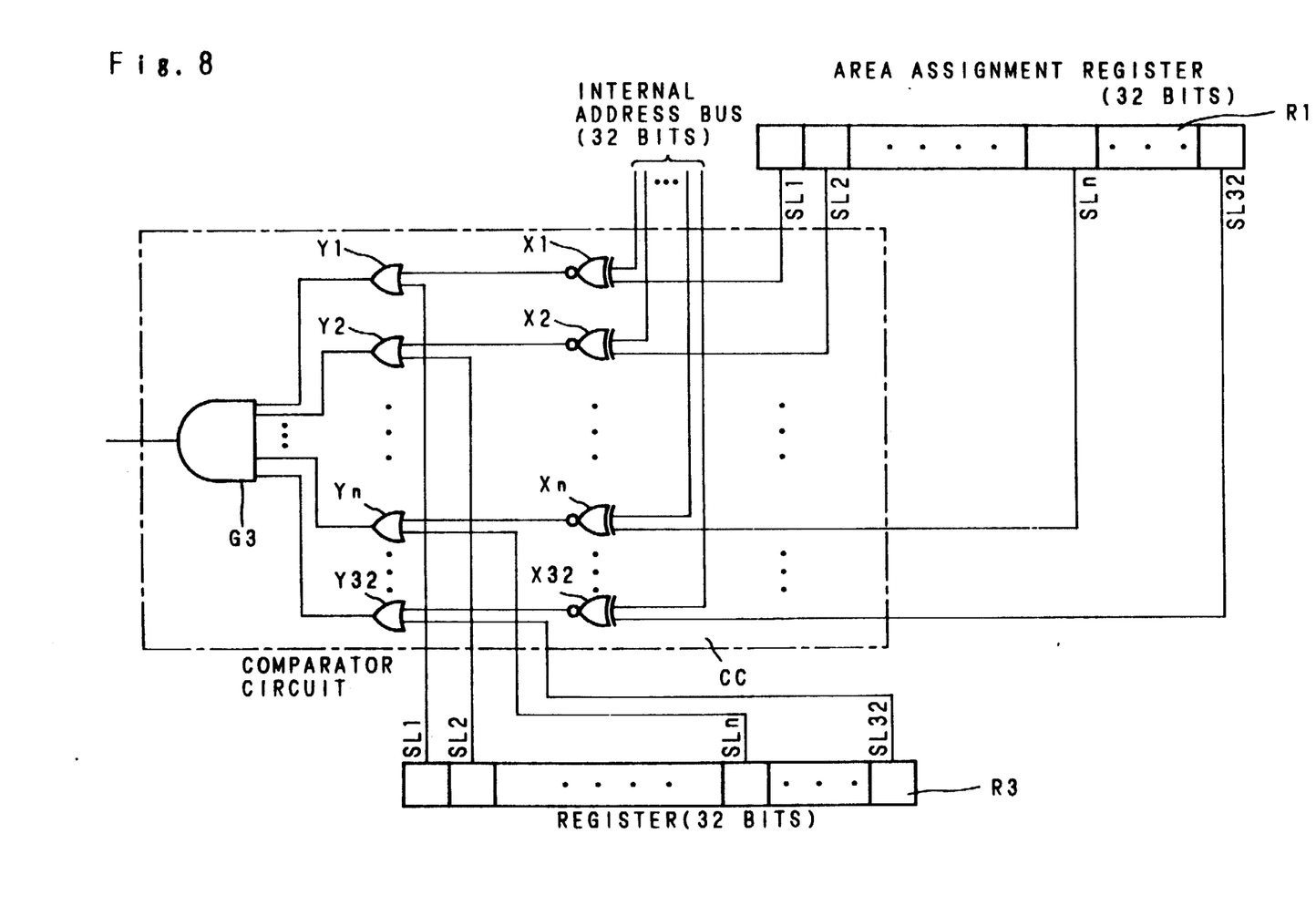
FIG. 8 is a comparator circuit diagram of a microprocessor according to another embodiment of the present invention which makes a shared memory area variable.
Figure 9A:
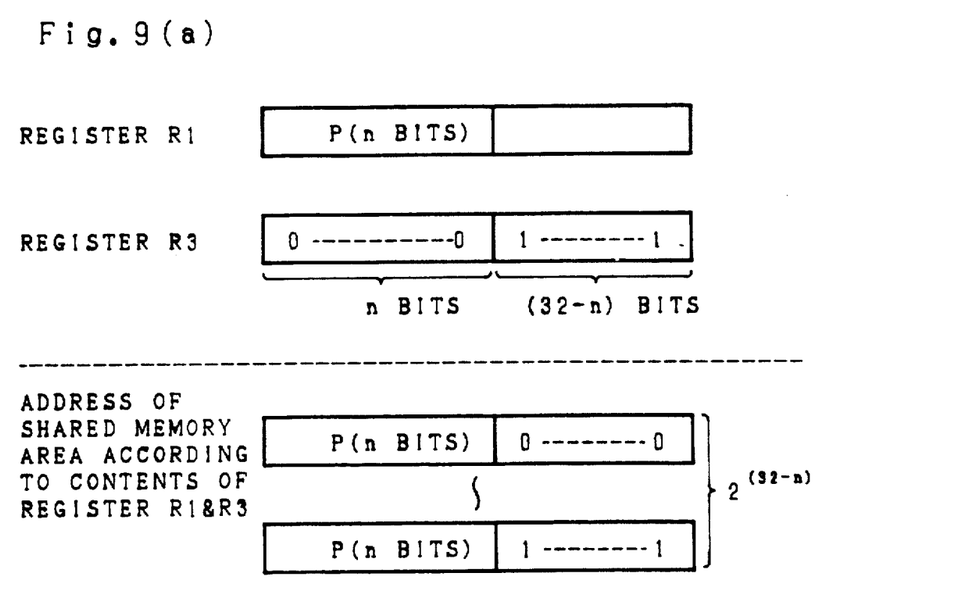
FIGS. 9(a) and 9(b) are views showing the relationship between an area assignment register and an area setting register of another embodiment.
Figure 9B:
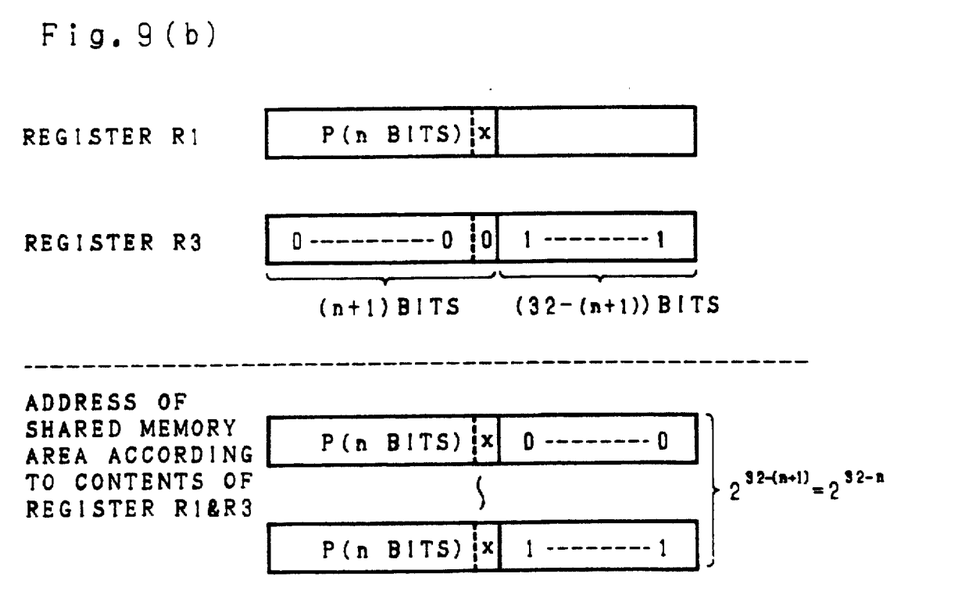
Figure 9C:
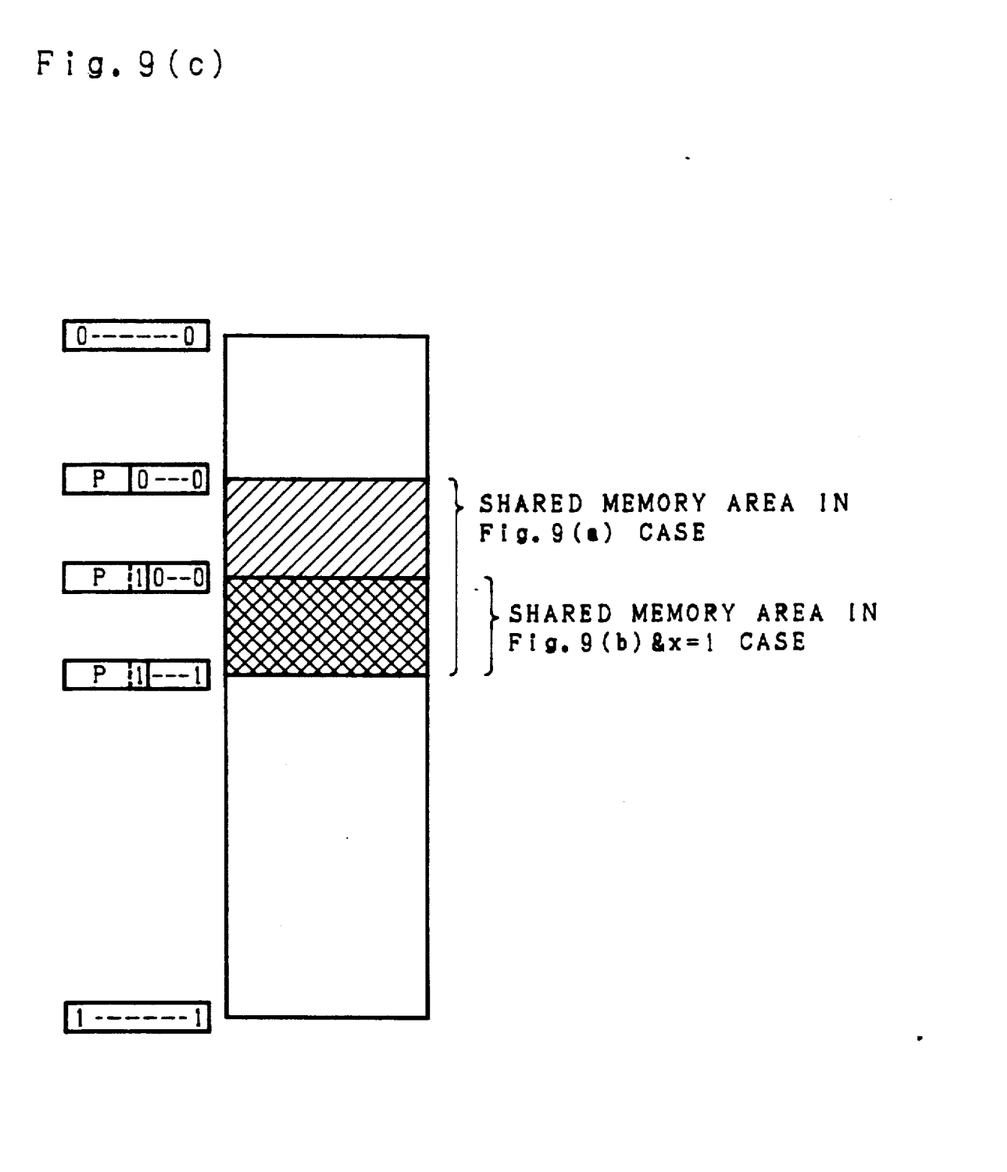
FIG. 9(c) is a view showing change, in the shared memory area.

Now, another embodiment of the present invention will be described. In this embodiment, arbitrary size of shared memory area (R) can be set by providing a register (R3) for setting the size of shared memory area and constituting the comparator circuit as shown in FIG. 8. Signal lines (MS1)~(MS32) from respective bits of the register (R3) are connected to OR gates (Y1)~(Y32). For, example, if "0...0" are written in higher n bits and "1...1" in lower (32-n) bits of the register (R3) as data, the outputs of the signal lines $(MS_{n+1})$~(MS32) become a "H" level and, as a result, the outputs of the OR gates $(Y_{n+1})$~(Y32) becomes the "H" level irrespective of contents of the register (R1) and the internal address bus. Therefore, in this case, the output values of the comparator circuit (CC) depend only upon respective higher n bits of the register (R1) and the internal address bus, and only when these two correspond to each other, the comparator circuit (CC) outputs the "H" level to the AND gate (G2). In this embodiment, as shown in FIG. 9 (a), the size of the shared memory area becomes $2^{32-n}$. In this case, if "P" (n bits) is written in the higher n bits of the register (R1), the shared memory area becomes the addresses "P . 0 . . . 0"~"P . 1 . . . 1". Then, as shown in FIG. 9 (b), if "0 . . . 0" are written in the higher n+1 bits and "1 . . . 1" in the other bits of the register (R3), the shared memory area becomes the addresses "P . X . 0 . . . 0"~"P . X . 1 . . . 1" (X=0 or 1), which is half in size compared with the former case. FIG. 9 (c) shows changes in the shared memory area when X=1. In such a way, by changing the contents of the register (R3), the size of shared memory area can be changed from the entire address space (when "1 . . . 1" are written in the register (R3)) to one (when "0 . . . 0" are written in the register (R3)) of the microprocessor.

Figure 10:
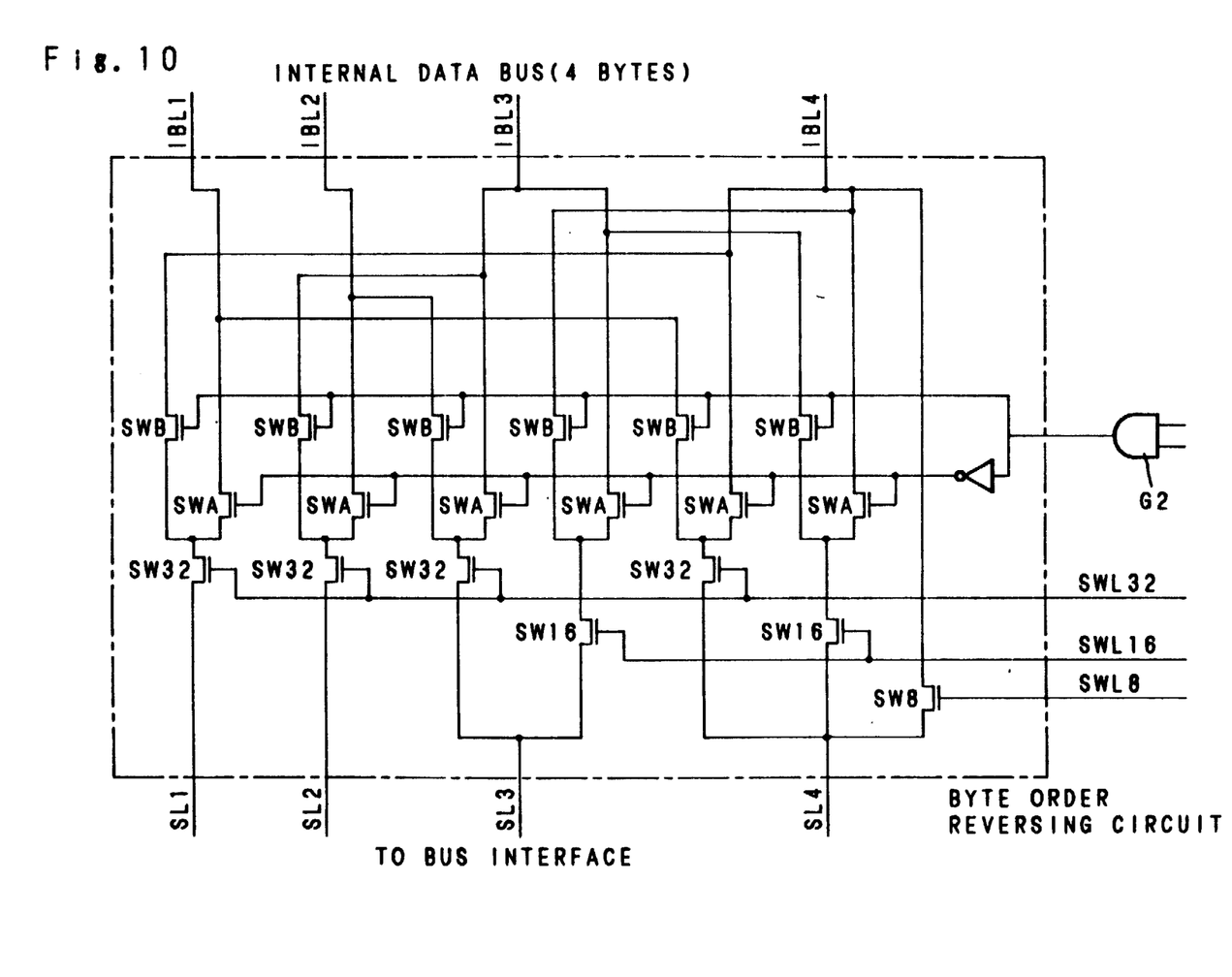
FIG. 10 is a circuit diagram of a byte reversing circuit of a microprocessor according to a third embodiment of the present invention for rearranging the byte order corresponding to the data length.

Next, still another embodiment will be described. In the embodiment, a byte order reversing circuit having a function to rearrange the byte order corresponding to the data length to be inputted and outputted is involved, and its circuit diagram is shown in FIG. 10. Signal lines (SWL8), (SWL16) and (SWL32) are connected respectively to switches (SW8), (SW16), and (SW32). For example, when the data length is 16 bits, by setting only the signal line (SWL16) at a "H" level, only the switch (SW16) is turned on, and only signal lines (SL3) and (SL4) are selected among the signal lines from the bus interface portion and only internal data buses (IBL3) and (IBL4) among the data buses. Corresponding to the output level of the AND gate (G2), these signal lines are connected directly or reversely.

As aforementioned, according to the present invention, since the microprocessor automatically determines the necessity of byte order rearrangement by the hardwares and executes the same, the execution speed in a multiprocessor system is increased and development of the system is facilitated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meter and bounds of the claims, or equivalence of such meter and bounds thereof are therefore intended to be embraced by the claims.

What is claimed is:

1. A microprocessor, which exchanges with external elements data of a plurality of bits arranged in a predetermined order, comprising:
    area assignment means for preassigning an area in an address space of a memory;
    order information holding means for holding order information of data transferred from an external element and stored in the area preassigned by said area assignment means, the order information indicating whether the transferred data are arranged in the predetermined order;
    data source determination means, responsive to the output of said area assignment means, for determining whether data stored in the memory and accessed by the microprocessor are from the preassigned area; and
    order rearrangement means, responsive to the output of said order information holding means and the output of said data source determination means, for automatically rearranging the data order of the accessed data if the accessed data are not arranged in the predetermined order when said data source determination means determines that the accessed data are from the preassigned area.

2. A microprocessor as set forth in claim 1, wherein said order rearrangement means includes a bus interface portion for interfacing exchange of data with the external elements.

3. A microprocessor as set forth in claim 1, further comprising, area setting means for setting the size of the area preassigned by said area assignment means.

4. A microprocessor as et forth in claim 1, further comprising, rearrangement control means for adjusting said order rearrangement means in response to the number of said accessed data bits so that only said number of bit lines of said order rearrangement means are selected for rearrangement operation.

5. A microprocessor as set forth in claim 1, wherein said predetermined order is of a big endian system.

6. A microprocessor as set forth in claim 1, wherein said predetermined order is of a little endian system.

7. A multiprocessor system having a plurality of microprocessors, each of which exchanges with internal and external elements data of a plurality of bits arranged in a predetermined order, comprising:
    a memory; and
    a plurality of microprocessors, each of which comprises:
    area assignment means for preassigning an area in an address space of said memory,
    order information holding means for holding order information of data transferred from one of the elements and stored in the area preassigned by said area assignment means, the order information indicating whether the transferred data are arranged in the predetermined order,
    data source determination means, responsive to the output of said area assignment means, for determining whether data stored in said memory and accessed by the microprocessor are from the preassigned area, and
    order rearrangement means, responsive to the output of said order information holding means and the output of said data source determination means, for automatically rearranging the data order of the accessed data if the accessed data are not arranged in the predetermined order when said data source determination means determines that the accessed data are from the preassigned area.

8. A microprocessor, which exchanges with external elements data of a plurality of bits arranged in a predetermined order, comprising:
    means for preassigning an area in an address space of an external memory;
    means for storing order status of data transferred from an external element and stored in the area preassigned by said preassigning means, the order status generated by software in advance and indicating whether the transferred data are arranged in the predetermined order;
    means, responsive to the output of said preassigning means, for determining whether data stored in the external memory and accessed by the microprocessor are from the preassigned area; and
    means, responsive to the output of said storing means and the output of said determining means, for automatically rearranging the data order of the accessed data if the accessed data are not arranged in the predetermined order when said determining means determines that the accessed data are from the preassigned area.

* * * * *

UNITED STATES PATENT AND TRADEMARK OFFICE
CERTIFICATE OF CORRECTION

PATENT NO. : 5,107,415
DATED : April 21, 1992
INVENTOR(S) : Koichi Sato, et al.

It is certified that error appears in the above-indentified patent and that said Letters Patent is hereby corrected as shown below:

Col. 3, line 12, "(TAB)" should be --(IAB)--.

Col. 3, lines 35, 43 and 44, delete "(C)".

Col. 3, line 37, "OOOA2H" should be --OOA2H--.

Col. 3, line 50, delete "185".

Col. 3, line 50, before "with" insert --register (R2), the output of the AND gate (G2) together--.

Col. 4, line 1, delete "(C)".

Col. 4, line 10, "show" should be --shows--.

Col. 5, lines 15 and 16, "meter" should be --metes--.

UNITED STATES PATENT AND TRADEMARK OFFICE
CERTIFICATE OF CORRECTION

PATENT NO. : 5,107,415

DATED : April 21, 1992

INVENTOR(S) : Koichi Sato, et al.

It is certified that error appears in the above-identified patent and that said Letters Patent is hereby corrected as shown below:

Column 5, line 50, "et" should be --set--.

Signed and Sealed this

Seventeenth Day of August, 1993

Attest:

*Attesting Officer*

BRUCE LEHMAN

*Commissioner of Patents and Trademarks*